Oct. 11, 1966 H. C. SWIFT 3,277,981
BRAKES
Filed Feb. 25, 1963 2 Sheets-Sheet 1
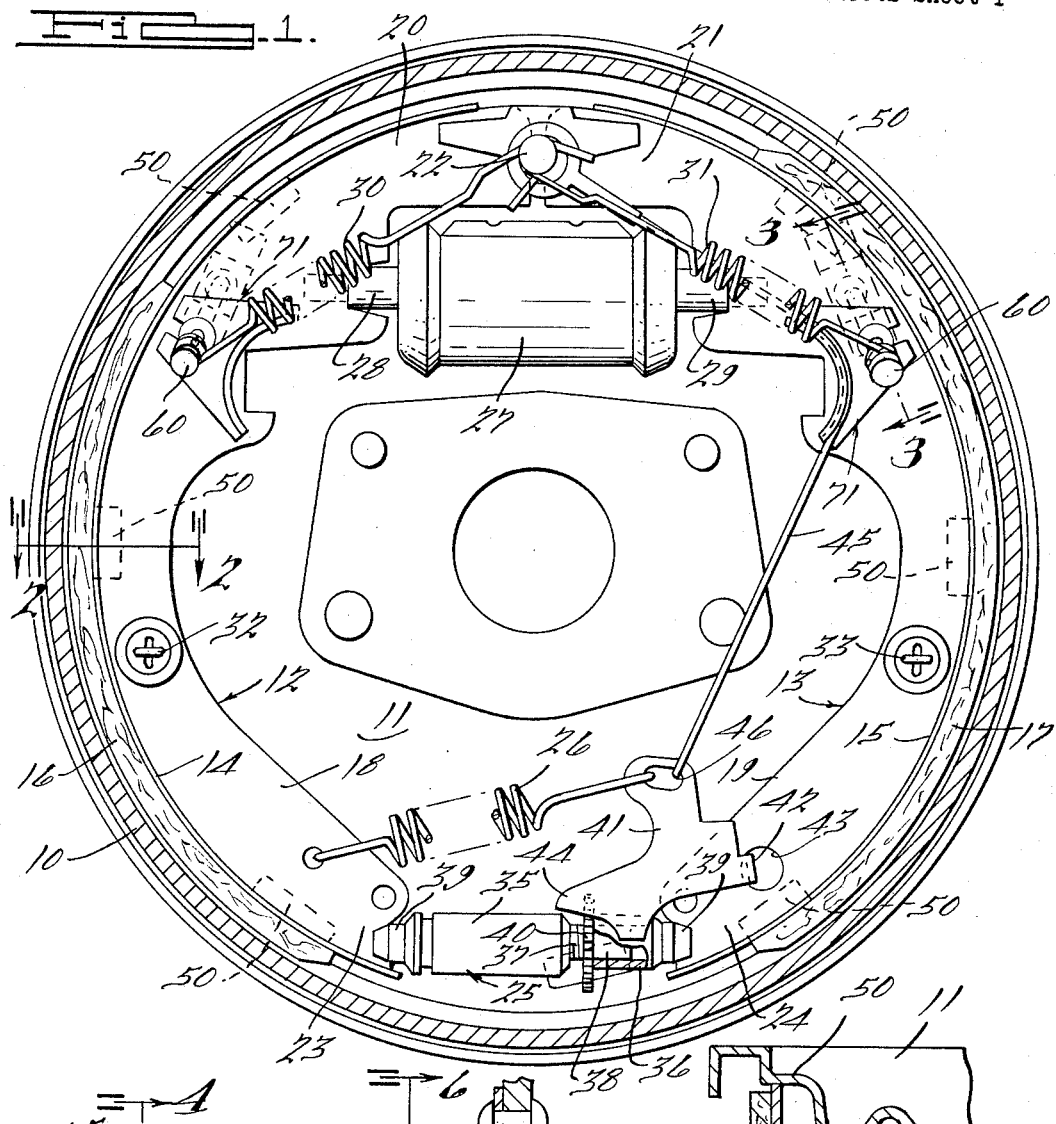
INVENTOR.
Harvey C. Swift.
BY
Harness, Dickey & Pierce.
ATTORNEYS.

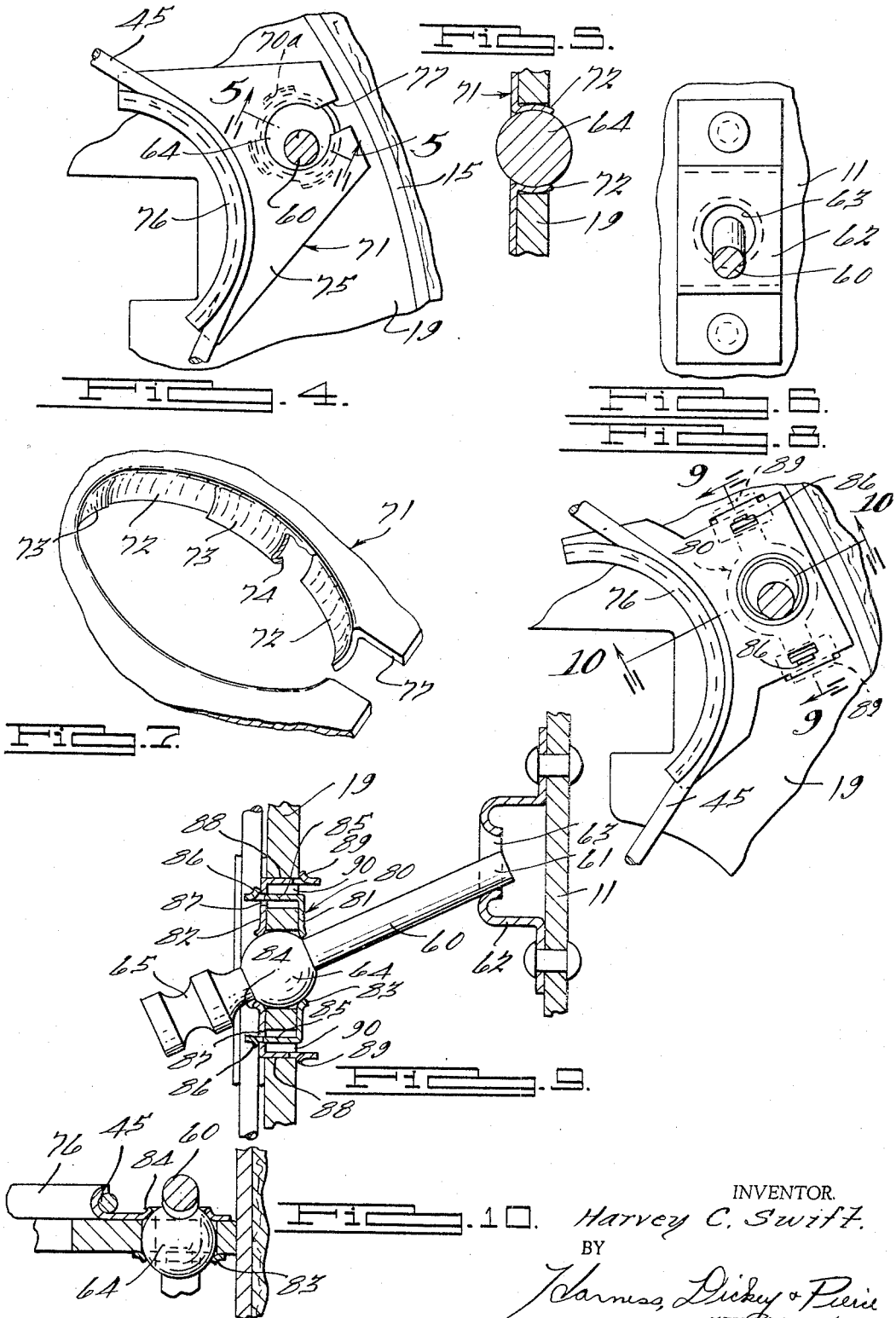

United States Patent Office 3,277,981
Patented Oct. 11, 1966

3,277,981
BRAKES
Harvey C. Swift, Birmingham, Mich., assignor to Kelsey-Hayes Company, Romulus, Mich., a corporation of Delaware
Filed Feb. 25, 1963, Ser. No. 260,698
8 Claims. (Cl. 188—78)

This invention relates to brakes and, more particularly, to a brake assembly of the internal expanding shoe type.

One of the objects of the present invention is to provide a brake assembly of this type having means for positively and reliably retracting the brake shoes away from the brake drum upon release of the braking pressure and without danger of the brake shoes becoming caught or accidentally held in contact with the brake drum.

In brakes of the type herein illustrated, each brake shoe is retracted by a lever which is pivotally connected at one end to the backing plate and is connected at its other end to a retraction spring. The intermediate portion of the lever extends through an aperture in the web of the brake shoe and is pivotally or swivelingly connected thereto.

One of the primary objects of this invention is to provide improved means for pivotally connecting the lever to the web of the brake shoe, which is of simple construction; may be readily manufactured as a stamping; and which may be quickly and easily assembled with the lever and the brake shoe web.

To this end the invention consists in providing a clip-like member or retainer, formed of sheet metal, shaped to provide means for embracing a spherical-shaped portion on the lever to permit pivotal or rocking movement thereof, and further shaped to provide spring tongues or resilient fingers adapted to snap into recesses or openings in the brake shoe web to secure the assembly in place.

The device of this invention is also useful in brakes having an adjusting member for automatically adjusting the brake shoe and cable means for connecting the adjusting member to the expansible end of the brake shoe. With such a construction, the clip plate or retainer provides a convenient element for carrying a cable engaging member for actuating the cable to move the adjusting member to operative position.

It is therefore an object of this invention to provide a device of this type having cable engaging means for actuating a brake shoe adjusting member upon movement of the expansible end of the brake shoe.

The various objects and advantages, and the novel details of construction of two commercially practical embodiments of the invention, will become more apparent as this description proceeds, especially when considered in connection with the accompanying drawings, in which:

FIGURE 1 is an elevational view of a brake incorporating the features of this invention, the brake shoes being shown in released position;

FIGURE 2 is a detail sectional view taken substantially on the plane indicated by line 2—2 in FIGURE 1;

FIGURE 3 is an enlarged fragmentary sectional view taken substantially on the plane indicated by line 3—3 in FIGURE 1;

FIGURE 4 is a sectional view taken substantially on the plane indicated by line 4—4 in FIGURE 3;

FIGURE 5 is a detail fragmentary sectional view taken substantially on the plane indicated by line 5—5 in FIGURE 4;

FIGURE 6 is a detail sectional view taken substantially on the plane indicated by line 6—6 in FIGURE 3;

FIGURE 7 is a fragmentary perspective view of the clip plate or retainer;

FIGURE 8 is a view similar to FIGURE 4 of a modified form of construction;

FIGURE 9 is a sectional view taken substantially on the plane indicated by line 9—9 in FIGURE 8; and FIGURE 10 is a detail sectional view taken substantially on the plane indicated by line 10—10 in FIGURE 8.

The illustrative embodiment of the invention is shown in the drawings as applied to a brake structure of the internal expanding type comprising arcuate brake shoes adapted to cooperate with the inner surfaces of a brake drum. In FIGURE 1, the reference character 10 indicates the brake drum mounted on the wheel hub of a vehicle (not shown) for rotation therewith. A stationary backing plate 11 is mounted on a stationary part (not shown) of the vehicle.

The basic elements of the brake structure comprise a pair of brake shoes 12 and 13 in the form of arcuate segments, said brake shoes being provided with arcuate rim portions 14 and 15 supporting lining elements 16 and 17, respectively. The rim portions 14 and 15 are reinforced against flexure by web portions 18 and 19 extending perpendicularly from the rim portions 14 and 15. The adjacent expansible ends 20 and 21 of the brake shoes 12 and 13 engage an anchor pin 22 fixed to the backing plate 11. The opposite articulated ends 23 and 24 of the brake shoes 12 and 13 engage an adjustable strut 25, with the brake shoe ends 23 and 24 being retained in engagement with the adjusting strut by means of a tension spring 26.

A hydraulic wheel cylinder 27 having plunger members 28 and 29 extending from opposite ends thereof into engagement with the webs 18 and 19 provides the actuating device for moving the brake shoes 12 and 13 into engagement with the brake drum 10. The plunger members 28 and 29 extend from piston members (not shown) within the wheel cylinder 27, hydraulic fluid being delivered into the wheel cylinder between the piston members from a conventional pedal operated master cylinder (not shown). Retraction springs 30 and 31 normally retain the ends 20 and 21 of the brake shoes in engagement with the anchor pin 22 when hydraulic pressure is released from the wheel cylinder 27. The brake shoes 12 and 13 are resiliently urged into engagement with the backing plate 11 by conventional spring assemblies 32 and 33.

The adjustable strut 25 for adjusting the brake shoes comprises a tubular internally threaded nut 35 and a socket 36 which receive the threaded stem 37 and non-threaded stem 38, respectively, of the adjusting portion of the strut. The ends 39 of the nut 35 and the socket 36 are slotted to receive the ends 23 and 24 of the webs of the brake shoes, thus preventing rotation of the nut 35 and the socket 36. A toothed wheel 40 is formed integrally with the stems 37 and 38, and the teeth on this toothed wheel provide a ratchet surface for turning the toothed wheel 40.

The reference character 41 indicates an adjusting member which is pivotally mounted on the brake shoe 13 by having an end portion 42 thereof bent through an aperture 43 in the web 19 of the brake shoe 13. The adjusting member 41 has a portion 44 acting as a pawl adapted to engage the teeth of the toothed wheel 40 to adjust the same. The adjusting member 41 is moved in one direction by means of a cable 45 connected to the adjusting member as at 46 at one end, and having its other end anchored to the backing plate 11 by being secured to the anchor pin 22 which projects from the backing plate. The adjusting member 41 is moved in the opposite direction by the spring 26.

The structure thus far described is substantially conventional in modern-day brakes and the present invention relates to a brake shoe retracting mechanism for positively and reliably retracting the brake shoes away from the brake drum upon release of the braking pressure, and to simple means for mounting and assembling this retracting means on the brake shoe.

Each brake shoe is seated against the backing plate for movement relative thereto upon the application and release of the brakes. If desired, the backing plate 11 may be provided with circumferentially spaced shelves or bearing surfaces 50 formed by pressing the metal of the backing plate 11 outwardly, as illustrated in FIGURE 2.

The brake retracting mechanism comprises a lever 60, see particularly FIGURE 3, which has one end 61 thereof pivotally connected to the backing plate 11 as, for instance, by means of a bracket 62 provided with an aperture 63 into which the end 61 of the lever 60 extends.

Intermediate its ends, the lever 60 is provided with a spherical-shaped portion 64, and the other end of the lever is provided with a groove 65 to receive the end of the retraction springs 31.

The lever 60 extends through an opening 70 in the web 19 of the brake shoe and is rockably supported on the brake shoe web by means of a clip-like member 71 which is adapted to embrace the spherical-shaped portion 64 and also to snap into engagement with the edges of the opening 70 in the brake shoe web. For this purpose, the clip-like member 71 is provided with radially, inwardly curved portions 72 adapted to embrace the spherical portion 64 of the lever (see FIGURE 5) and with spring fingers or tongues 73 having return bent end portions 74 adapted to engage behind the surface of the brake shoe web after they have passed through the opening 70 in the brake shoe web. In order to provide a clearance for the return bent portion 74, the opening 70 in the brake shoe web is provided with slots 70a.

The clip-like member 71, as shown probably best in FIGURE 4, consists of a substantially triangular body 75 and is provided with an arcuate grooved portion 76 adapted to engage the cable 45 to move the cable when the brake shoe 13 is moved, to actuate the adjusting member 41.

The body 75 of the clip-like member is provided with a slot 77 extending through the periphery thereof, so that the clip-like member, which is formed of sheet metal, may be sprung into engagement with the spherical-shaped portion 74 in assembling the clip-like member with the lever 60.

In mounting the device onto the brake shoe web, the clip-like member is first assembled with the lever 60 and then this assembly is snapped into engagement with the brake shoe web.

As will be apparent from the description thus far, the lever 60 is pivotally connected to the backing plate and rockably connected to the brake shoe web, so that the brake shoe is positively and reliably guided in its movement toward and away from the brake drum without danger of the brake shoe becoming caught or accidentally held in contact with the brake drum.

In FIGURES 8, 9 and 10, a slightly modified form of construction is illustrated, in which the means for rockably connecting the lever 60 to the brake shoe web 19 consists of a retainer assembly indicated generally by the reference character 80. This retainer assembly consists of two opposed stamped sections 81 and 82, each provided, respectively, with a circumferentially arranged curved finger or flange portion 83 and 84 adapted to embrace the spherical portion 64 of the lever 60. The section 81 is provided with a pair of opposed spring fingers 85 provided with detents 86 adapted to engage slots 87 formed in the other section 82. The two sections 81 and 82 are engaged with opposite sides of the spherical portion 64 and are secured together by the spring fingers 85. The other section 82 is provided with a pair of opposed spring fingers 88 provided with detents 89, and the assembly is secured to the brake shoe web 19 by inserting the spring fingers 88 through openings 90 formed in the brake shoe web, as probably best illustrated in FIGURE 9.

With either one of the constructions heretofore described, the lever 60 is mounted for rocking movement on the brake shoe web and the constructions are such that the clip-like member or retainer may be readily assembled with the lever 60 and then this assembly readily secured in place on the brake shoe web. Both constructions are simple and the clip-like member or retainer may be made from sheet metal by a stamping operation, and thus may be economically produced. As pointed out, the method of assembling is simple so that the device may be assembled with facility.

While two commercially practical embodiments of the invention have been described and illustrated herein somewhat in detail, it will be understood that various changes may be made as may come within the purview of the accompanying claims.

What is claimed is:

1. A brake mechanism comprising, a backing plate, a brake shoe seated against said backing plate for movement relative thereto, said shoe having a radial web spaced from the backing plate, a lever pivotally connected adjacent one end to said backing plate and extending through an opening in said brake shoe web, spring means connecting the other end of said lever to said backing plate, a clip-like member having means engaging said lever to rockably support the same, and resilient means on said clip-like member engaging said opening in the brake shoe web to secure said clip-like member thereto.

2. A brake mechanism comprising, a backing plate, a brake shoe seated against said backing plate for movement relative thereto, said shoe having a radial web spaced from the backing plate, a lever pivotally connected adjacent one end to said backing plate for rocking movement relative theerto, said lever extending through an opening in said brake shoe web, a brake shoe retracting spring connected to the other end of said lever and to said backing plate, and a clip-like member embracing a spherical-shaped portion on said lever to pivotally support said lever, said clip-like member being provided with spring means engaging said opening in the brake shoe web to secure said clip-like member thereto.

3. A brake mechanism comprising, a backing plate, a brake shoe seated against said backing plate for movement relative thereto, said shoe having a radial web spaced from the backing plate, a lever pivotally connected adjacent one end to said backing plate for rocking movement relative thereto, said lever extending through an opening in said brake shoe web, a brake shoe retracting spring connected to the other end of said lever and to said backing plate, a clip-like member embracing said lever to rockably support the same, and spring tongues on said clip-like member resiliently engaging the edge of said opening in the brake shoe web to secure said clip-like member thereto.

4. A brake mechanism comprising, a backing plate, a brake shoe seated against said backing plate for movement relative thereto, said shoe having a radial web spaced from the backing plate, a lever pivotally connected adjacent one end to said backing plate for rocking movement relative thereto, said lever extending through an opening in said brake shoe web, a brake shoe retracting spring connected to the other end of said lever and to said backing plate, and a clip-like member provided with inwardly curved fingers embracing a spherical portion on said lever to rockably support the same, and provided with spring tongues adapted to snap into said opening in the brake shoe web to secure said clip-like member thereto.

5. A brake mechanism comprising, a backing plate, a brake shoe seated against said backing plate for movement relative thereto, said shoe having a radial web spaced from the backing plate, a lever pivotally connected adjacent one end to said backing plate and extending through an opening in said brake shoe web, a retracting spring connected to the other end of said lever and to said backing plate, said lever being provided with a spherical-shaped portion at the area where it passes through said web, and a clip-like member provided with radially, inwardly curved fingers embracing said spherical-shaped portion to rockably support said lever, and provided with spring tongues adapted to snap into said opening in the brake shoe web to secure said clip-like member and lever thereto.

6. A brake mechanism comprising, a backing plate, a brake shoe seated against said backing plate for movement relative thereto, said shoe having a radial web spaced from the backing plate, a lever pivotally connected adjacent one end to said backing plate and extending through an opening in said brake shoe web, a retracting spring connecting the other end of said lever to said backing plate, said lever being provided with a spherical-shaped portion at the area where it passes through said web, and a retainer member formed of two opposed sections each having curved fingers embracing opposite sides of said spherical-shaped portion, one of said sections having spring tongues adapted to snap into openings in the other section to secure said sections in assembled relation, and spring tongues on the other section adapted to snap into openings in said brake shoe web to secure said retainer member thereto.

7. A device as described in claim 5 in which said curved fingers and spring tongues are alternately arranged.

8. A device as described in claim 5 in which said clip-like member is formed of sheet metal and is provided with a radially extending slot to permit said clip-like member to be sprung into engagement with the spherical-shaped portion of said lever.

References Cited by the Examiner

UNITED STATES PATENTS

| | | | |
|---|---|---|---|
| 2,978,072 | 4/1961 | Burnett | 188—79.5 |
| 3,003,591 | 10/1961 | Rike | 188—78 |
| 3,061,051 | 10/1962 | Swift | 188—78 |

DUANE A. REGER, *Primary Examiner.*

ARTHUR L. LA POINT, R. DAVID BLAKESLEE,
*Examiners.*

J. K. FOWLER, *Assistant Examiner.*